(12) United States Patent
Jasper

(10) Patent No.: US 11,565,665 B2
(45) Date of Patent: Jan. 31, 2023

(54) LANDING LEG ASSEMBLY FOR VEHICLES

(71) Applicant: SAF-HOLLAND, Inc., Muskegon, MI (US)

(72) Inventor: Jeffrey R. Jasper, Washington, MO (US)

(73) Assignee: SAF-Holland, Inc., Muskegon, MI (US)

( * ) Notice: Subject to any disclaimer, the term of this patent is extended or adjusted under 35 U.S.C. 154(b) by 448 days.

(21) Appl. No.: 16/773,420

(22) Filed: Jan. 27, 2020

(65) Prior Publication Data

US 2020/0238957 A1    Jul. 30, 2020

Related U.S. Application Data

(60) Provisional application No. 62/797,477, filed on Jan. 28, 2019.

(51) Int. Cl.

| | |
|---|---|
| *F16C 33/12* | (2006.01) |
| *B60S 9/08* | (2006.01) |
| *F16H 25/20* | (2006.01) |
| *F16H 57/00* | (2012.01) |
| *F16H 57/021* | (2012.01) |
| *F16H 57/02* | (2012.01) |

(52) U.S. Cl.
CPC .............. *B60S 9/08* (2013.01); *F16C 33/121* (2013.01); *F16H 25/20* (2013.01); *F16H 57/0018* (2013.01); *F16H 57/021* (2013.01); *F16C 2204/52* (2013.01); *F16H 2025/2093* (2013.01); *F16H 2057/02082* (2013.01)

(58) Field of Classification Search
CPC ...... F16C 17/02; F16C 33/121; F16C 33/128; F16C 33/145; F16C 33/74; F16C 35/02; F16C 2204/52; F16C 2204/72; F16C 2220/30; B60S 9/08
See application file for complete search history.

(56) References Cited

U.S. PATENT DOCUMENTS

| | | |
|---|---|---|
| 3,892,141 A | 7/1975 | Phillips, Jr. et al. |
| 4,205,824 A | 6/1980 | Mai |
| | (Continued) | |

FOREIGN PATENT DOCUMENTS

| | | | | |
|---|---|---|---|---|
| EP | 2163444 B1 * | 1/2011 | ............... | B60S 9/08 |
| FR | 2486601 A1 * | 1/1982 | | |
| | (Continued) | | | |

Primary Examiner — Phillip A Johnson
(74) Attorney, Agent, or Firm — Price Heneveld LLP

(57) ABSTRACT

A landing leg assembly for a heavy duty commercial vehicle includes a first leg member defining an interior space, a second leg member telescopingly engaging the first leg member and movable between a retracted position and an extended position with respect to the first leg member, a gear assembly at least partially located within the interior space of the first leg member and operably coupled to the second leg member and configured to receive an input from a user to move the first leg member between the retracted and extended positions, the gear assembly including a shaft member and a gear member fixed for rotation with the shaft member, and an integral, single-piece bearing member including a bore that rotatably receives the shaft member, wherein the bearing member comprises a powdered metal and is directly welded to the first leg member.

30 Claims, 10 Drawing Sheets

(56) References Cited

U.S. PATENT DOCUMENTS

| | | | |
|---|---|---|---|
| 4,452,347 A | 6/1984 | Dozier | |
| 4,923,175 A | 5/1990 | Bentrup | |
| 5,538,255 A | 7/1996 | Barker | |
| 5,743,015 A | 4/1998 | Kunze et al. | |
| 6,141,997 A | 11/2000 | Blehi, III | |
| 6,579,030 B2 | 6/2003 | Uhler et al. | |
| 7,083,196 B2 | 8/2006 | Riedl | |
| 7,258,363 B2 | 8/2007 | Baxter | |
| 7,279,140 B2 | 10/2007 | Myers et al. | |
| 7,380,825 B2 | 6/2008 | Peveler | |
| 7,798,034 B2 | 9/2010 | Drake | |
| 8,051,545 B2 * | 11/2011 | Peveler | B60S 9/08 29/434 |
| 8,276,885 B2 * | 10/2012 | Muller | B65D 90/14 254/419 |
| 2010/0014793 A1 | 1/2010 | Bingert | |
| 2010/0266225 A1 * | 10/2010 | Yamashita | F16C 33/107 384/114 |

FOREIGN PATENT DOCUMENTS

| | | | | |
|---|---|---|---|---|
| JP | 2001271129 A | * | 10/2001 | B22F 7/06 |
| WO | WO-2015037668 A1 | * | 3/2015 | B22F 1/0003 |

* cited by examiner

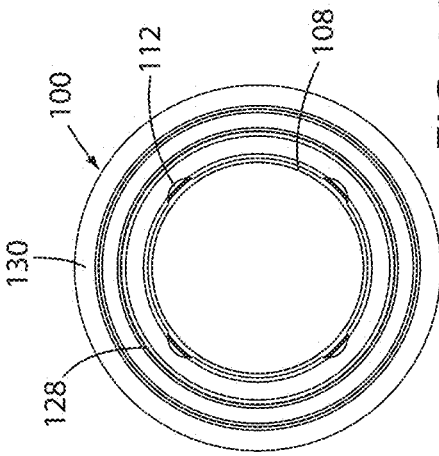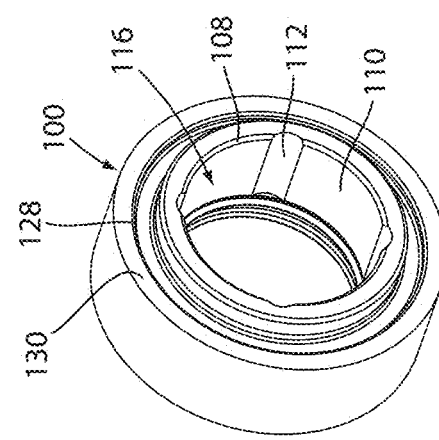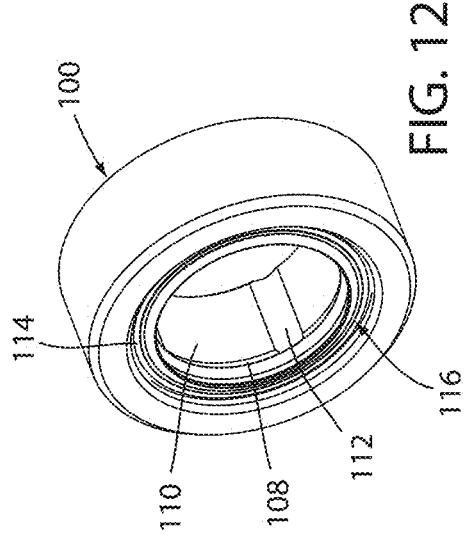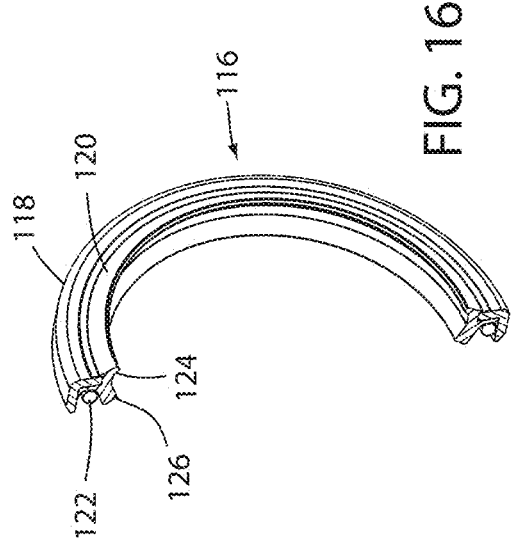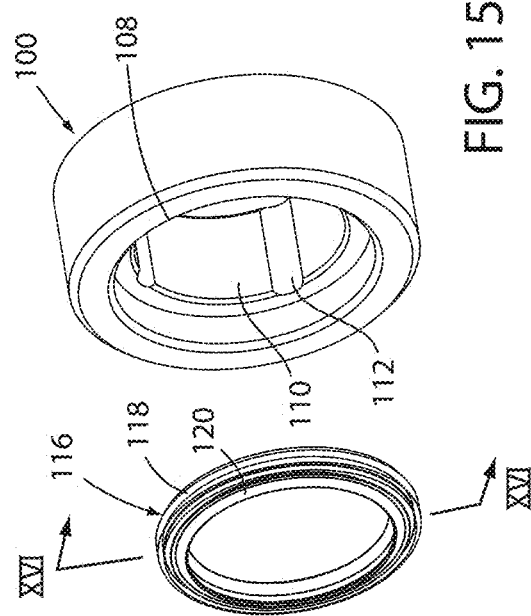

LANDING LEG ASSEMBLY FOR VEHICLES

CROSS-REFERENCE TO RELATED APPLICATIONS

This application claims the benefit of U.S. Provisional Patent Application No. 62/797,477, filed on Jan. 28, 2019, entitled "LANDING LEG ASSEMBLY FOR VEHICLES," the entire disclosures of which are incorporated herein.

BACKGROUND OF THE INVENTION

The embodiments as disclosed herein relate to a landing leg assembly for heavy-duty commercial vehicles such as semi-trailers, and specifically to a landing leg assembly that includes a gear arrangement operable to move the landing leg assembly between a retracted position and an extended position, where the gear arrangement is at least partially supported by a bearing member comprising a powdered metal bearing welded directly to components of the landing leg assembly without the requirement of secondary mounting arrangements or components.

SUMMARY OF THE INVENTION

One embodiment as disclosed includes a landing leg assembly for a heavy duty commercial vehicle that includes a first leg member defining an interior space, a second leg member telescopingly engaging the first leg member and movable between a retracted position and an extended position with respect to the first leg member, a gear assembly at least partially located within the interior space of the first leg member and operably coupled to the second leg member and configured to receive an input from a user to move the first leg member between the retracted and extended positions, the gear assembly including a shaft member and a gear member fixed for rotation with the shaft member, and an integral, single-piece bearing member including a bore that rotatably receives the shaft member, wherein the bearing member comprises a powdered metal and is directly welded to the first leg member.

Another embodiment as disclosed includes a landing leg assembly for a heavy duty commercial vehicle that includes a first leg member defining an interior space, a second leg member telescopingly engaging the first leg member and movable between a retracted position and an extended position with respect to the first leg member, a gear assembly operably coupled to the second leg member and configured to receive an input from a user to move the first leg member between the retracted and extended positions, the gear assembly including a shaft member and a gear member fixed for rotation with the shaft member. The landing leg assembly further includes an integral, single-piece bearing member including a bore that rotatably receives the shaft member, wherein the bearing member comprises a powdered iron nickel alloy having a density of greater than or equal to about 6.75 g/cc and is directly welded to the first leg member, wherein the bore includes a bore wall and at least one relief extending longitudinally along the bore wall, and wherein the bore includes a circumferentially extending relief, and a seal member located within the circumferentially extending relief of the bore of the bearing member, wherein the seal member is position between the bearing member and the shaft.

Yet another embodiment includes a landing leg assembly for a heavy duty commercial vehicle that includes a first leg member defining an interior space, a second leg member coupled to the first leg member and movable between a first position and a second position with respect to the first leg member, and a gear assembly at least partially located within the interior space of the first leg member and operably coupled to the second leg member and configured to receive an input from a user to move the first leg member between the first and second positions, the gear assembly including a shaft member and a gear member fixed for rotation with the shaft member. The embodiment further includes an integral, single-piece bearing member including a bore that rotatably receives the shaft member, wherein the bearing member comprises a powdered metal and is directly welded to the first leg member.

These and other features, advantages and objects of the present invention will be further understood and appreciated by those skilled in the art by reference to the following specification, claims and appended drawings.

BRIEF DESCRIPTION OF THE DRAWINGS

FIG. 12 is a perspective view of the bearing member;

FIG. 13 is a perspective view of the bearing member;

FIG. 14 is a front elevational view of the bearing member;

FIG. 15 is an exploded perspective view of the bearing member and a seal member; and FIG. 16 is a cross-sectional view of the seal member taken along the line XVI-XVI, FIG. 15.

DETAILED DESCRIPTION OF PREFERRED EMBODIMENT

Figure 2:
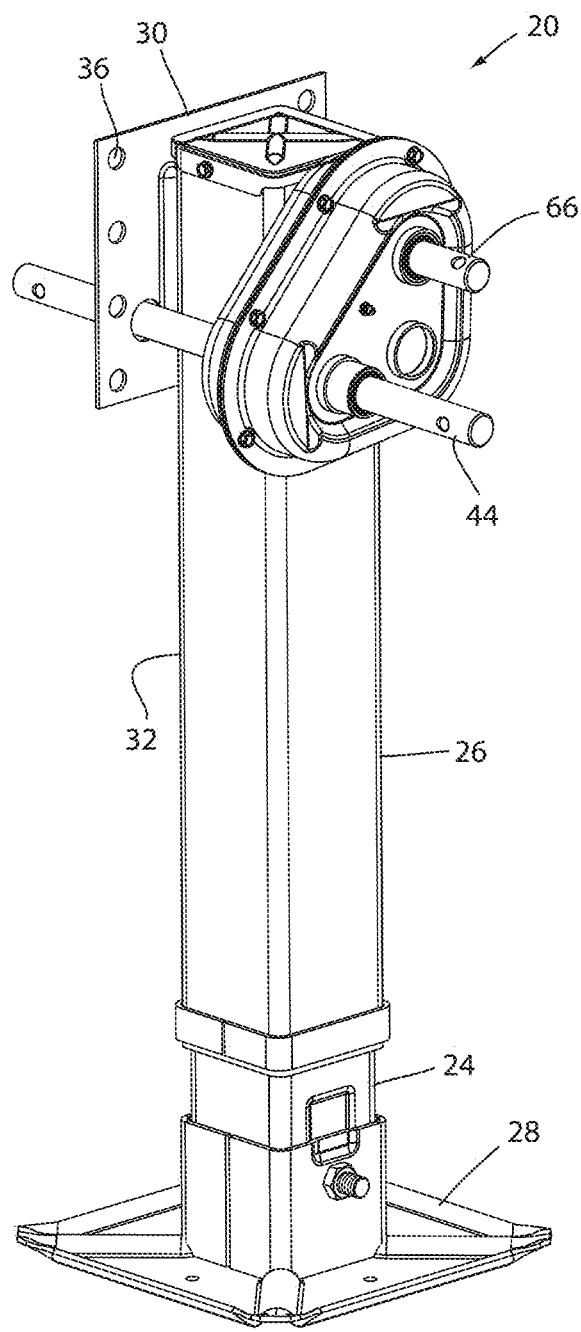
FIG. 2 is a perspective view of a landing leg assembly.
Figure 3:
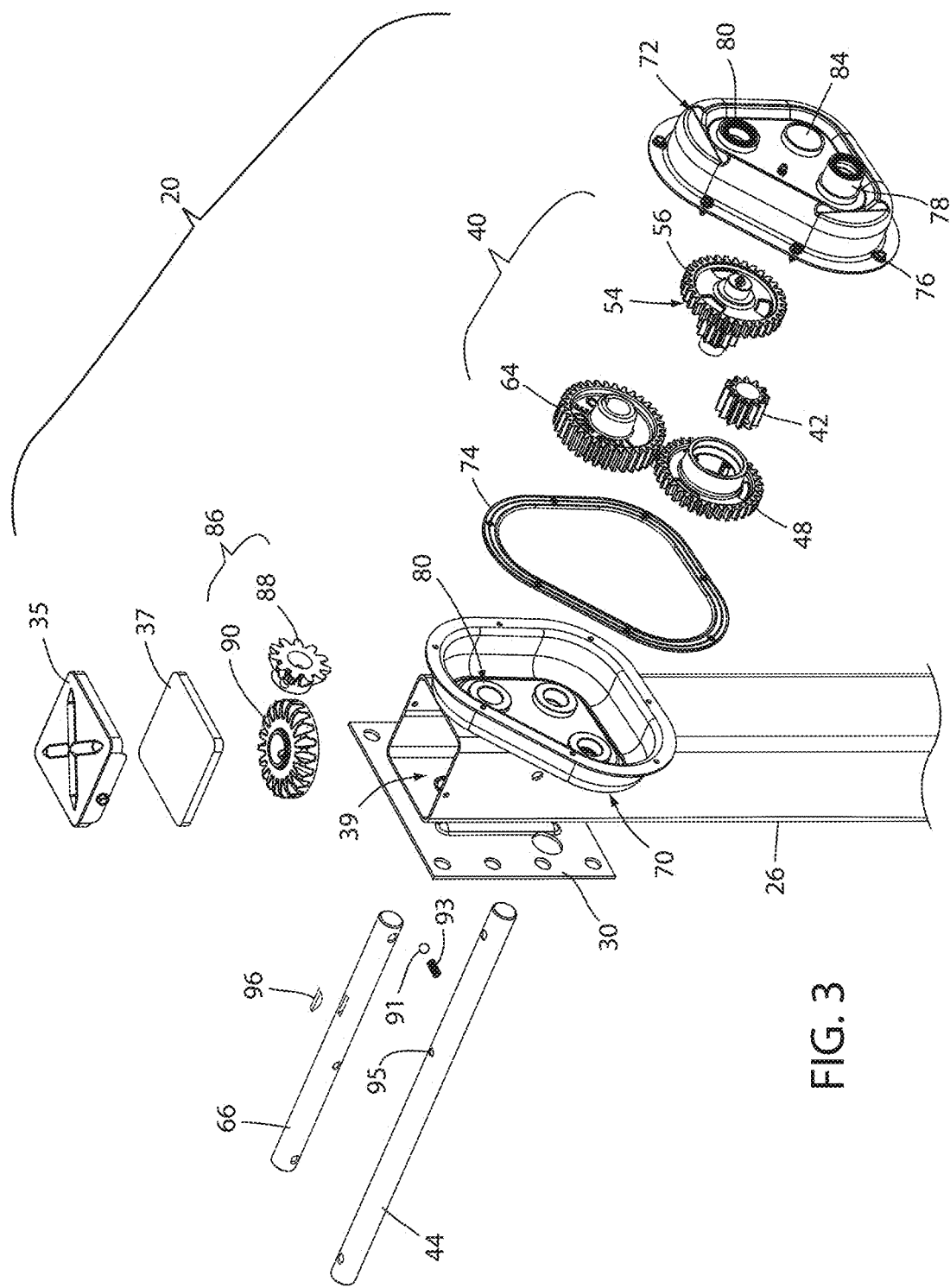
FIG. 3 is an exploded perspective view of the landing leg assembly.
Figure 4:
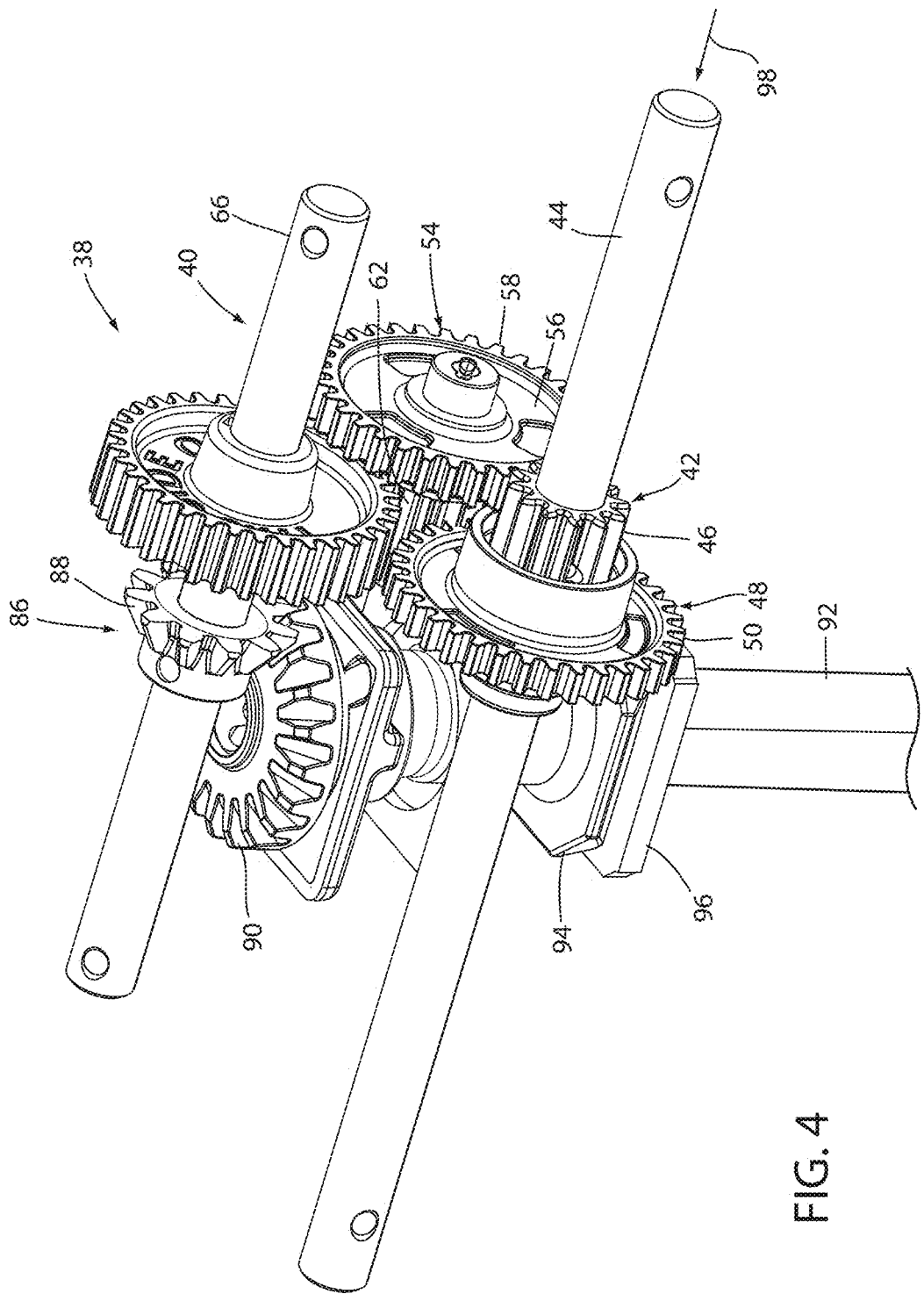
FIG. 4 is a perspective view of a gear assembly of the landing leg assembly.
Figure 5:
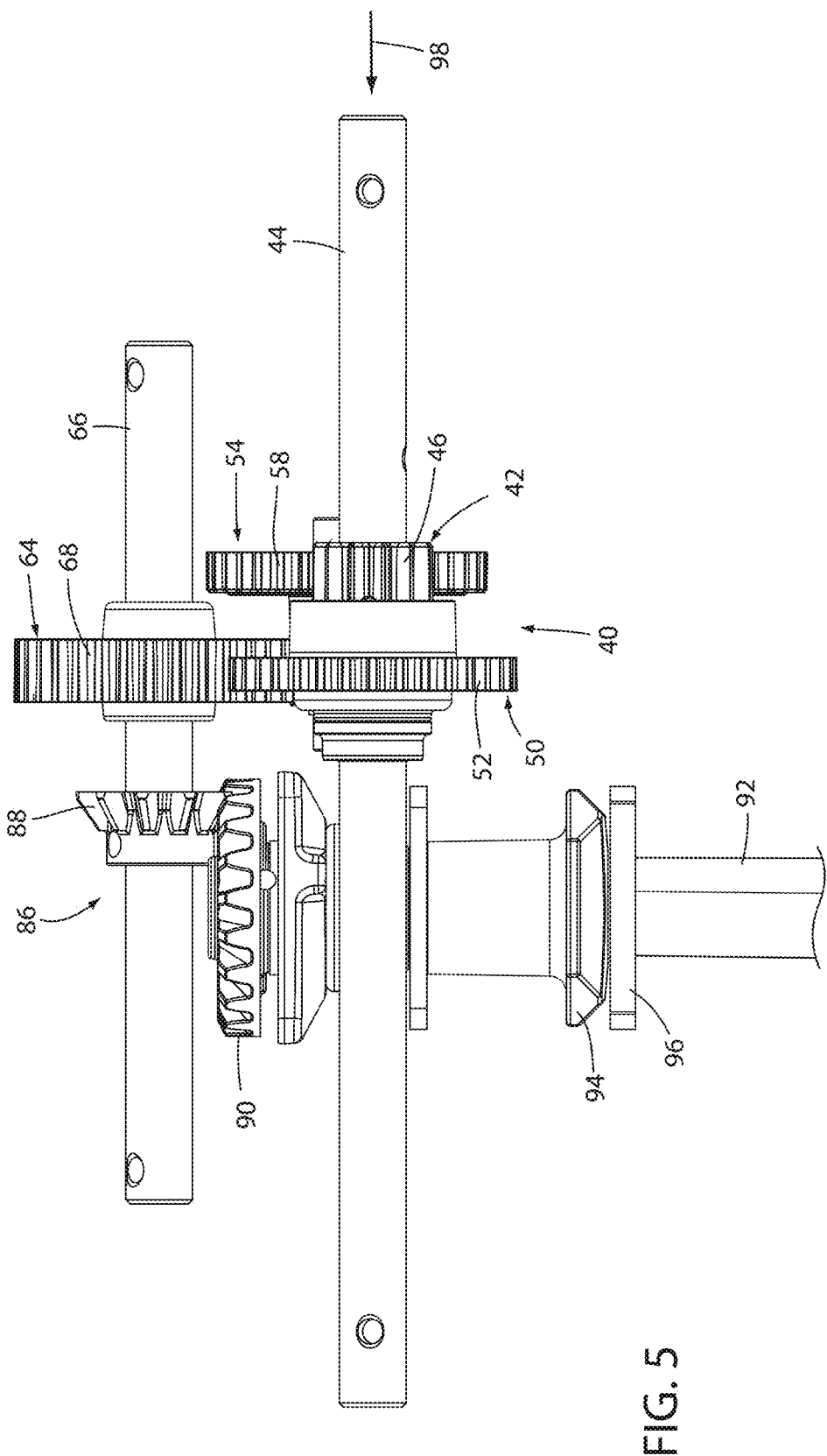
FIG. 5 is a front elevational view of the gear assembly.
Figure 6:
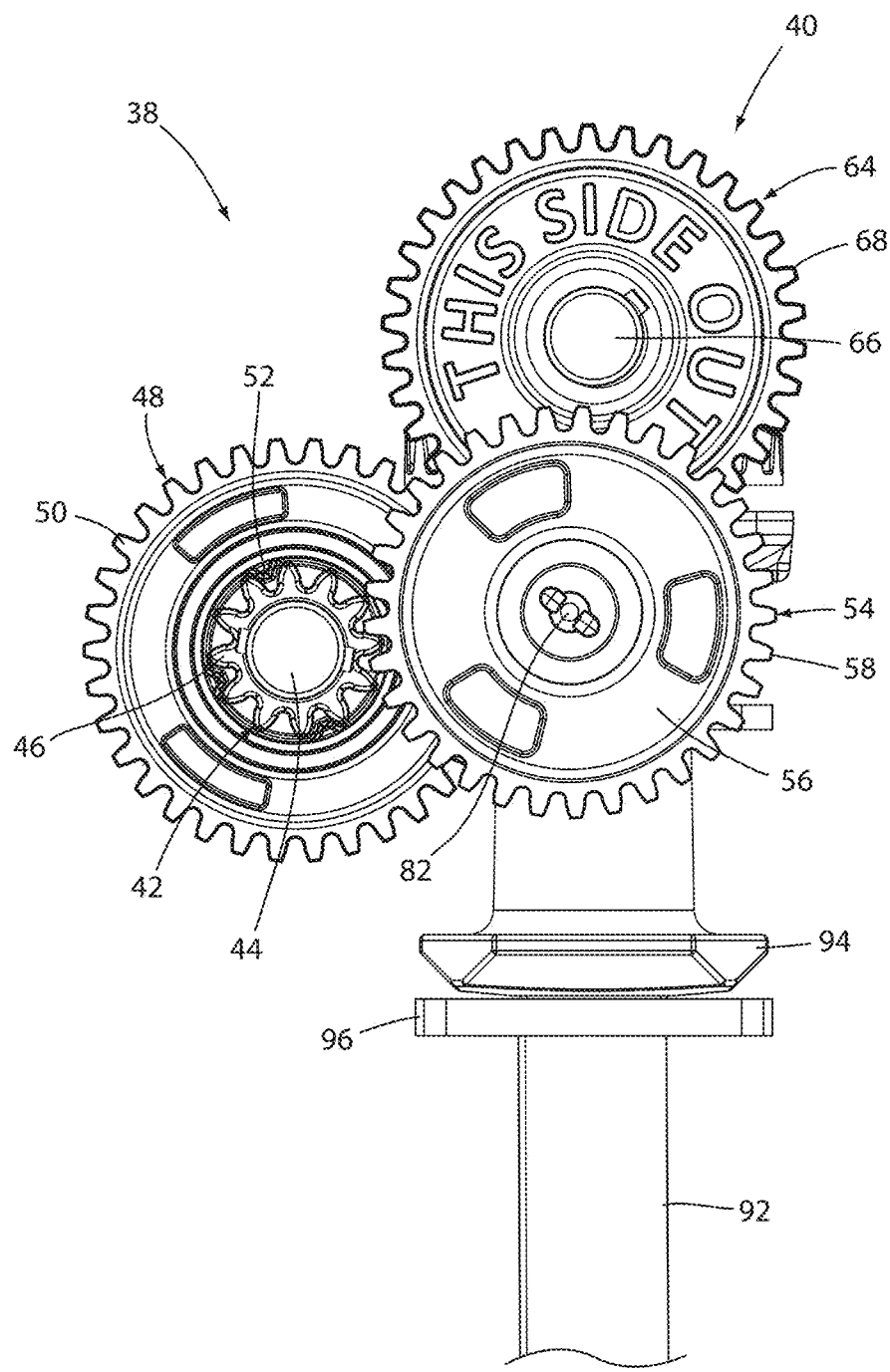
FIG. 6 is a side elevational view of the gear assembly.
Figure 7:
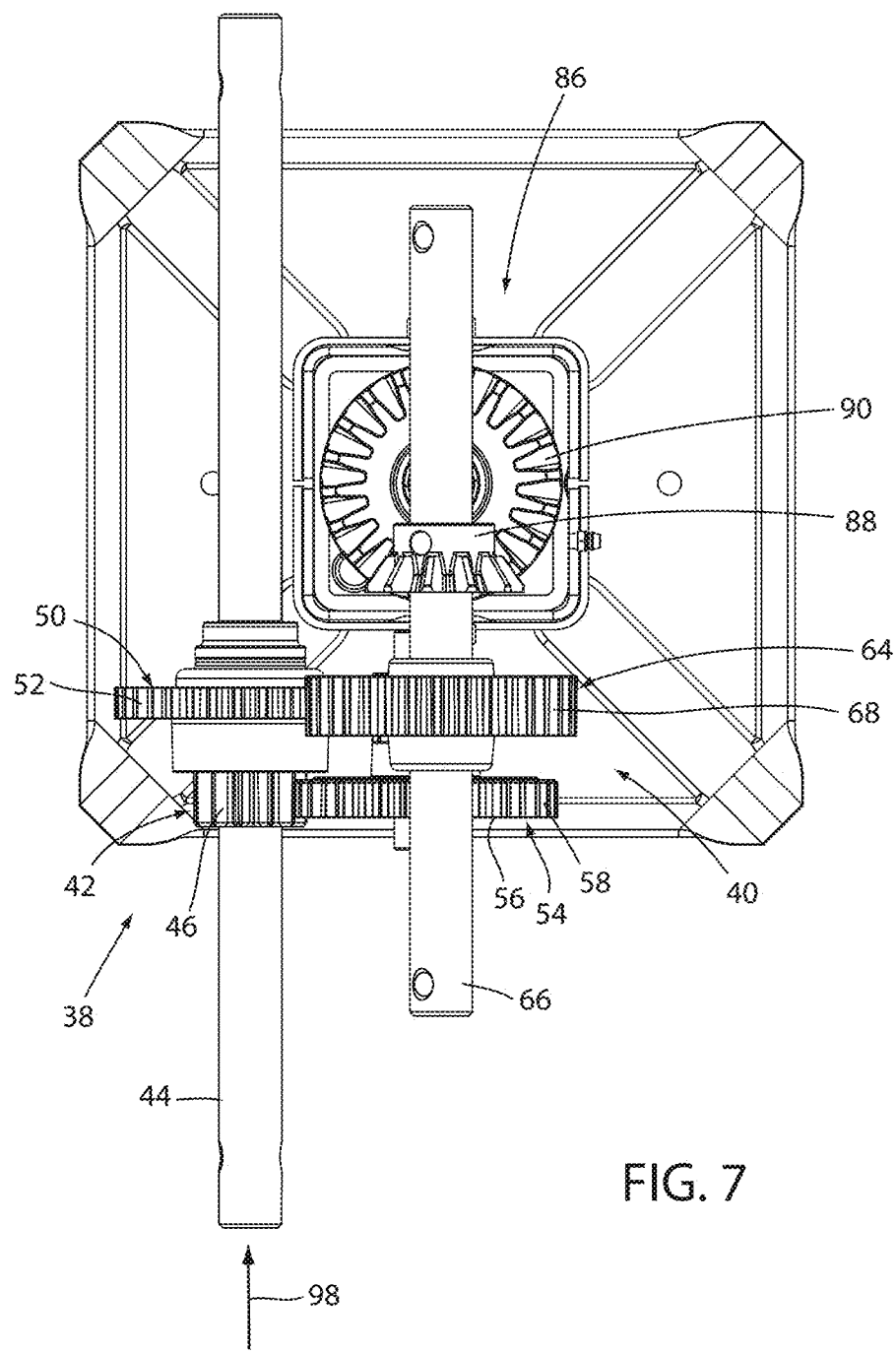
FIG. 7 is a top plan view of the gear assembly.

For purposes of description herein, the terms "upper," "lower," "right," "left," "rear," "front," "vertical," "horizontal," and derivatives thereof shall relate to the invention as oriented in FIGS. 2 and 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Figure 1:
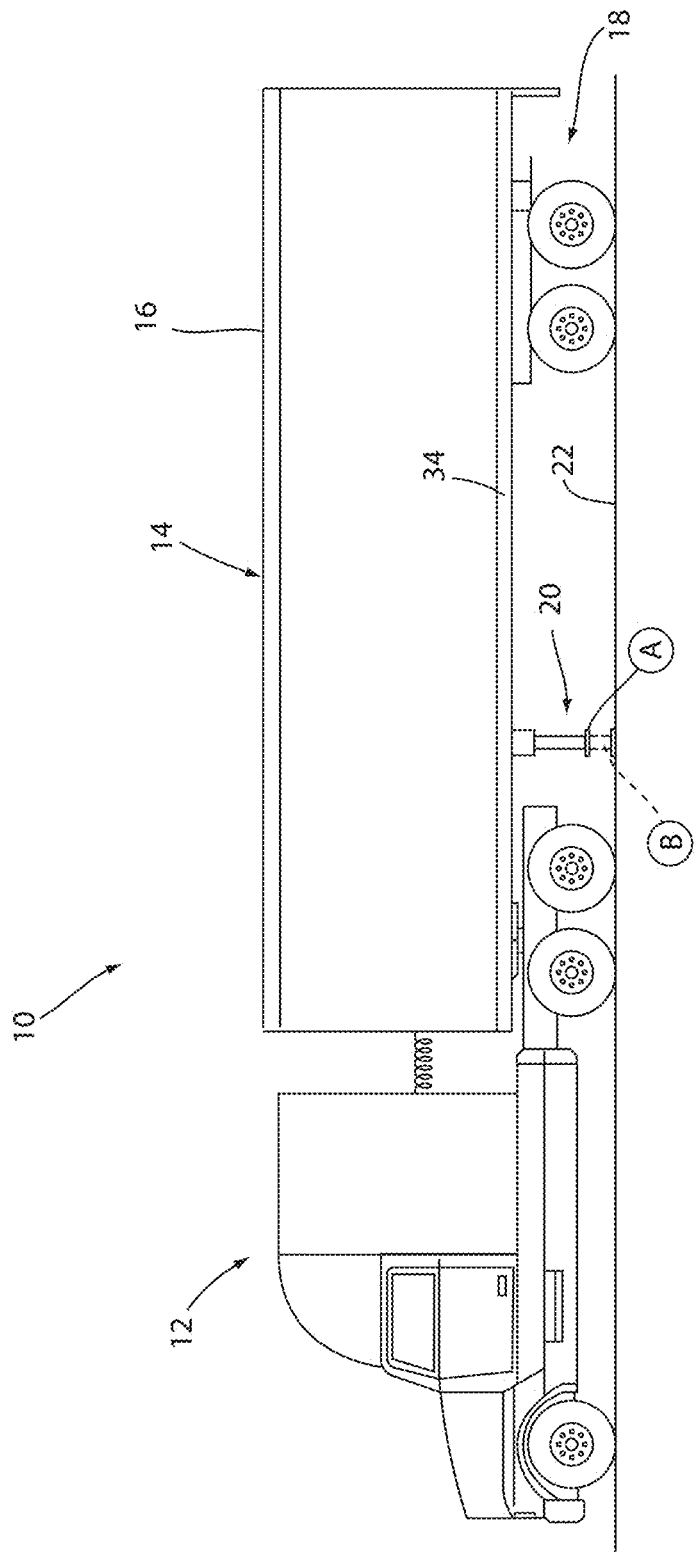
FIG. 1 is a side elevational view of a heavy-duty commercial vehicle arrangement including a semi-truck and a semi-trailer.

A vehicle combination 10 (FIG. 1) includes a towing vehicle shown as the tractor or semi-truck 12 and a towed vehicle shown as a heavy-duty commercial trailer or semi-trailer 14. In the illustrated example, the semi-trailer 14 includes a trailer body 16 supported at one end by a suspension assembly 18, and at an opposite end by the truck 12. The trailer 14 further includes a landing gear assembly or landing leg assembly 20 movable between a raised position A where the landing gear is spaced from a supporting ground surface 22, and a lowered or extended position B, where the landing leg assembly 20 abuts the ground surface 22 and supports the forward end of the trailer 14, thereby allowing the truck 12 to be uncoupled from and removed from beneath the trailer 14.

As best illustrated in FIGS. 2 and 3, the landing leg assembly 20 includes a lower leg or housing 24 telescopingly received within an upper leg or housing 26, a foot member 28 affixed to a distal end of the lower leg 24, wherein the foot member 28 is configured to abut the ground surface 22 when the landing leg assembly 20 is in the extended position B, and a mounting plate 30 fixedly secured to an outer surface 32 of the upper leg 26 and configured to secure the landing leg assembly 20 to a frame member 34 of the trailer 14 via a plurality of mechanical fasteners (not shown) that are received within apertures 36 of the mounting plate 30. The lower leg 24, the upper leg 26 and the mounting plate 30 each comprise a metal. A cover 35 and a plate 37 cooperate with the upper leg 26 to define an interior space 39.

The landing leg assembly 20 further includes a gear assembly or gear train 38 (FIGS. 4-7) configured to receive an input from an operator to drive the landing leg assembly 20 between the retracted and extended positions A, B. In the example, a manual input from an operator via a handle or crank assembly (not shown) or mechanical input from an electric motor, hydraulic actuator and the like may be utilized. In the illustrated example, the gear assembly 38 includes a low input gear 42 fixed for rotation on an input shaft 44 and having a plurality of gear teeth 46, a high input gear 48 received on the input shaft 44 and including a plurality of outer teeth 50 and a plurality of inner teeth 52, an idler gear 54 having a large radius portion 56 having a plurality of teeth 58 and a reduced radius portion 60 having a plurality of teeth 62, and an output gear 64 fixed for rotation with a jack shaft 66 and having a plurality of teeth 68. In the illustrated example, the input gear assembly 40 is housed within a housing arrangement that includes an inner gearbox cover 70 and a cooperating outer gearbox cover 72 where a gearbox gasket 74 is positioned therebetween and the gearbox covers 70, 72 are secured to one another via a plurality of mechanical fasteners such as bolts 76. In the illustrated example, the input shaft 44 is supported within the gearbox covers 70, 72 by a pair of bushings 78, the jack shaft 66 is supported within the gearbox covers 70, 72 by a pair of bushings 80, and an idler shaft 82 which supports the idler gear 54 is supported within the gearbox covers 70, 72 by a pair of bushings 84. A drive gear assembly 86 includes a first bevel gear 88 fixed for rotation with the jack shaft 66, and a second spindle gear 90 engaged by the first spindle gear 88 and fixed for rotation with a threaded driveshaft 92. A drive nut 94 is threadably received on the threaded driveshaft 92 and is secured to an interior of the lower leg 24 via a plate 96 such that movement of the drive nut 94 along the length of the driveshaft 92 telescopingly moves the lower leg 24 with respect to the upper leg 26 between the retracted and extended positions A, B.

In the illustrated example, the gear assembly 38 is adjustable between a high speed, low torque extension/retraction configuration and a low speed, high torque extension/retraction configuration. In the low-speed, high torque extension/ retraction configuration, the low input gear 42 is aligned with the idler gear 50 such that the outer teeth 46 of the input gear assembly 40 engage the teeth 58 of the idler gear 54, which in turn rotates the reduced radius portion 60 of the idler gear 54 where the teeth 62 of the reduced radius portion engage the teeth 68 of the output gear 64. Rotation of the output gear 64 in turn rotates the jack shaft 66 which is locked for rotation with the output gear 54 via an output gear key 96, which in turn drives the bevel gears 88, 90 and the drive nut 94 along the driveshaft 92, thereby moving the lower leg 24 between the retracted and extended positions A, B. In a high-speed, low torque configuration, the input shaft 44 is displaced inwardly in a direction 98 such that the low input gear 42 is aligned with the high output gear 48 and the teeth 46 of the low input gear 42 engage the inner teeth 52 of the high output gear 48. Rotation of the input shaft 44 causes the low input gear 42 to then drive the high input gear 48, which in turn drives the reduced radius portion 48 of the idler gear 54, which in turn drives the output gear 64. A locking ball 91 is biased via a spring 93 and is configured to engage reliefs 95 spaced along the length of the input shaft 44 to retain the input shaft in the selected high speed and low speed configurations.

Figure 8:
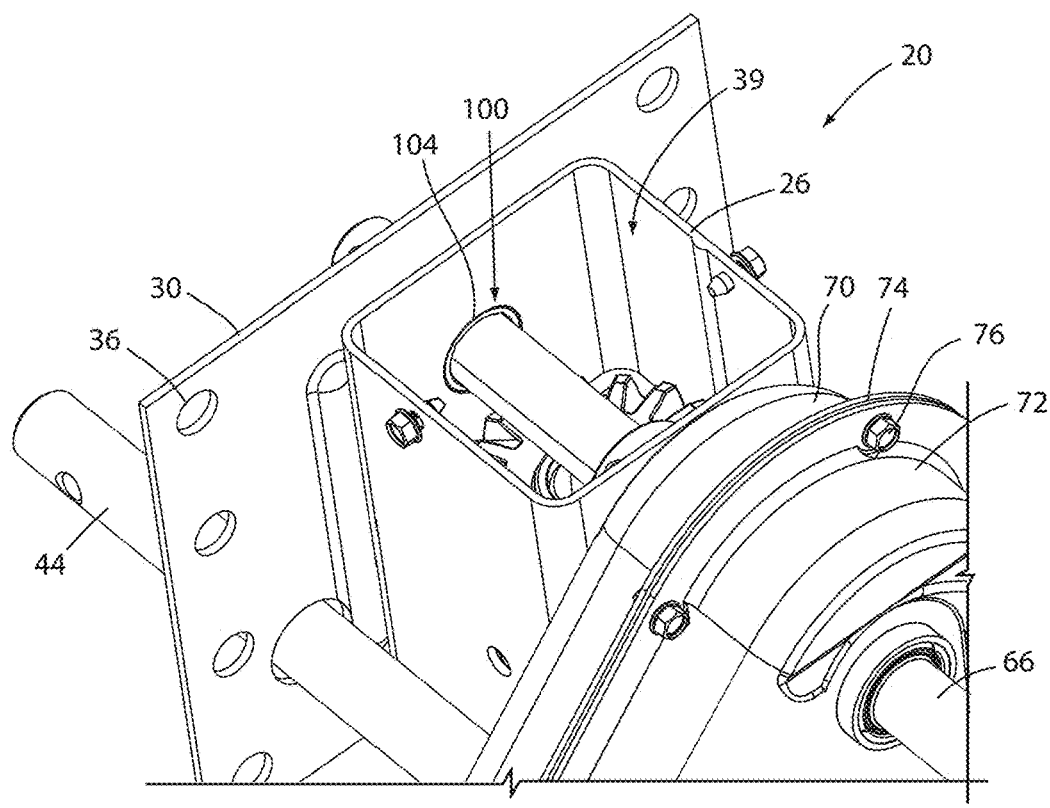
FIG. 8 is a top perspective view of the landing leg assembly wherein a top cover has been removed to show an interior space of a top leg member.
Figure 9:
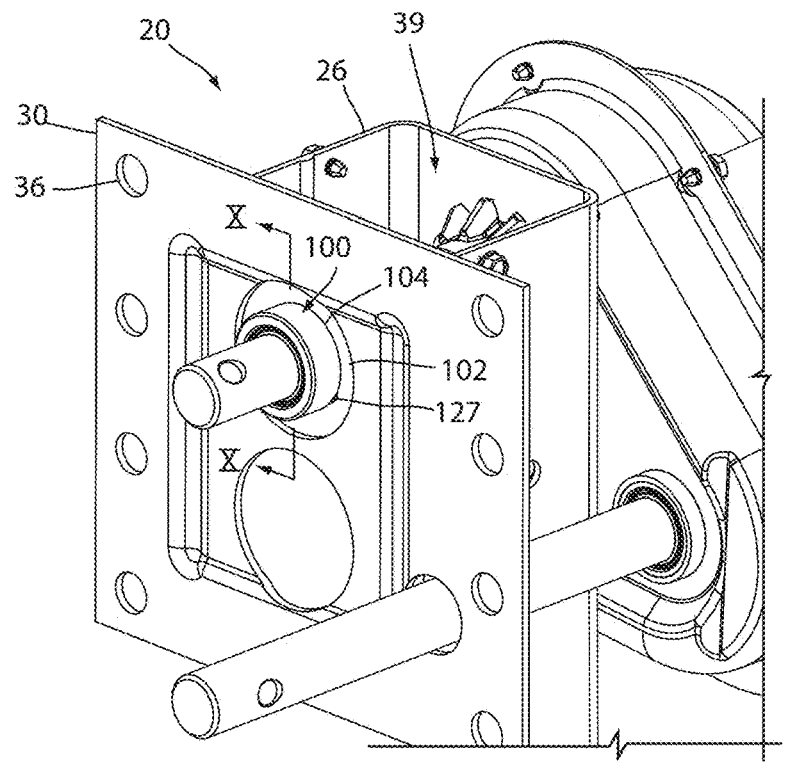
FIG. 9 is a perspective view of the leg assembly including a bearing member.
Figure 10:
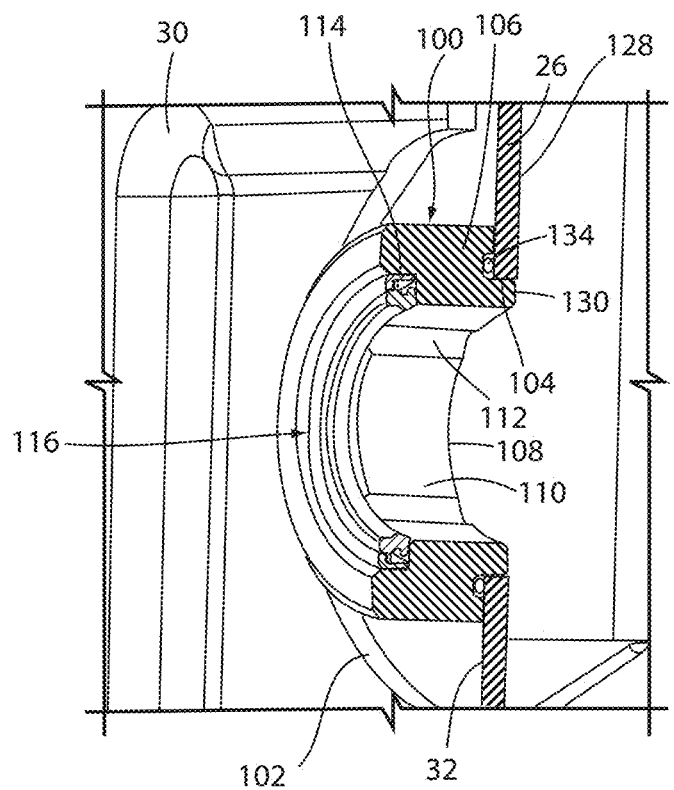
FIG. 10 is a cross sectional view of the bearing member taken along the line X-X, FIG. 9.
Figure 11:
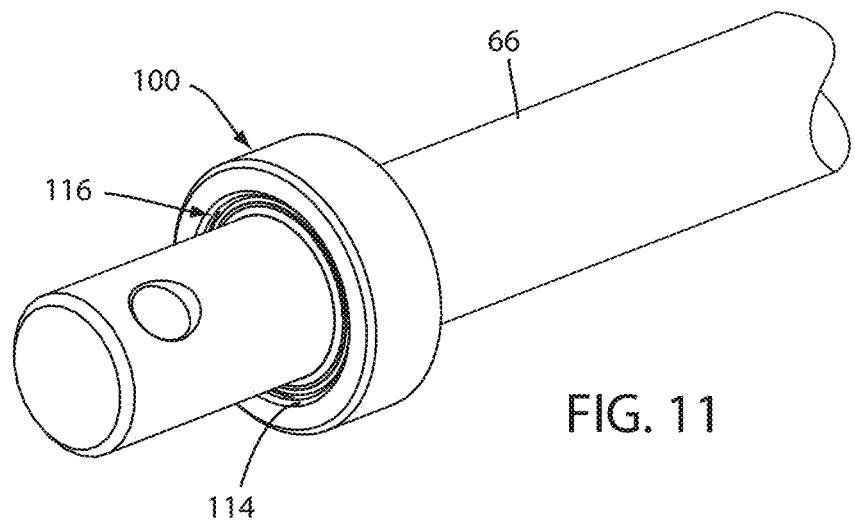
FIG. 11 is a perspective view of the bearing member positioned on an associated shaft.

As best illustrated in FIGS. 8 and 9, the jack shaft 66 is further supported by the upper leg 26 via a bushing 100. The bushing 100 extends through an aperture 102 of the mounting plate 30 and an aperture 104 of the upper legs 26. In the illustrated example, the bushing includes an integral, single-piece body 106 having a bore 108 extending therethrough, where the bore 108 receives the jack shaft 66 therethrough. In the illustrated example, the bore 108 includes a bore wall 110, a plurality of reliefs 112 extending longitudinally along the bore wall 110 and spaced about the circumference of the bore wall 110, and a circumferentially extending relief 114. The reliefs 112 are spaced about the circumference of the bore 108 so as to promote movement of grease and/or oil between the bushing 100 and the jack shaft 66. The body 106 comprises a powdered metal comprising an iron nickel alloy. Preferably, the density of the powdered metal bearing member is greater than or equal to about 6.75 g/cc, and more preferably greater than or equal to about 6.9 g/cc. In one example, the bearing member may comprise MPIF (Metal Powder Industry Federation) FN-0208-35.

In the instant example, the seal 116 (FIGS. 10-16) includes a dual-lip flexible seal including a substantially rigid mounting portion 118, a flexible inner portion 120, and a biasing member 122. The inner portion 120 includes an inner lip 124 and an outer lip 126 each configured to extend from the body 108 of the bushing 100 and toward the jack shaft 162, where the inner lip 124 and the outer lip 126 are spaced from one another along the length of the jack shaft 66. The biasing member 122 extends about the inner portion 120 and biases the lips 124, 126 inwardly toward the jack shaft 66. In the illustrated example, the mounting portion 118 comprises a metal, while the inner portion 126 comprises a thermoset. In assembly, the mounting portion 118 of the seal 116 is press-fit within the relief 114 of the bore 108 of the bushing 100.

The bushing 100 is secured to the upper leg 26 by positioning the bushing 100 within the aperture 104 of the upper leg 26 and welding the body 106 of the bushing 100 directly to the upper leg 26. Preferably, the bushing 100 is welded to the upper leg 26 via a pair of stitch welds 127 located on opposite sides of the bushing 100. It is noted that the bushing 100 is welded directly to the upper leg 26 without the use of separate mounting structures. It is further noted that the bushing 100 is secured to an exterior of upper leg 26 such that the bushing 100 does not extend into the interior space 39 of the upper leg 26, thereby reducing the interior space required within the upper leg and allowing for the packaging of more robust or alternative gear components within the interior space 39.

The body 106 of the bushing 100 may further include a relief 128 that extends into an end face 130 of the body 106 and that receives an O-ring 134 therein such that the O-ring is trapped and seals between the end face 130 of the body 106 of the bushing 100 and the outer surface 32 of the upper leg 26.

In the foregoing description, it will be readily appreciated by those skilled in the art that modifications may be made to the embodiments as disclosed herein without departing from the concepts as disclosed herein. Such modifications are to be considered as included in the following claims, unless these claims by the language expressly state otherwise.

The invention claimed is:

1. A landing leg assembly for a heavy duty commercial vehicle, comprising:
   a first leg member defining an interior space;
   a second leg member telescopingly engaging the first leg member and movable between a retracted position and an extended position with respect to the first leg member;
   a gear assembly at least partially located within the interior space of the first leg member and operably coupled to the second leg member and configured to receive an input from a user to move the first leg member between the retracted and extended positions, the gear assembly including a shaft member and a gear member fixed for rotation with the shaft member; and
   an integral, single-piece bearing member including a bore that rotatably receives the shaft member, wherein the bearing member comprises a powdered metal and is directly welded to the first leg member.

2. The landing leg assembly of claim 1, wherein the bearing member is welded to the first leg member via at least two stitch welds spaced from one another.

3. The landing leg assembly of claim 1, wherein the bearing member comprises an iron nickel alloy.

4. The landing leg assembly of claim 3, wherein the density of the bearing member is greater than or equal to about 6.75 g/cc.

5. The landing leg assembly of claim 4, wherein the density of the bearing member is greater than or equal to about 6.9 g/cc.

6. The landing leg assembly of claim 1, wherein the bore includes a bore wall and at least one relief extending longitudinally along the bore wall.

7. The landing leg assembly of claim 6, wherein the at least one relief includes a plurality of reliefs spaced about the bore wall from one another.

8. The landing leg assembly of claim 1, further including:
   a seal member located within the bore of the bearing member, wherein the seal member is positioned between the bearing member and the shaft.

9. The landing leg assembly of claim 8, wherein the bore includes a circumferentially extending relief that receives the seal member therein.

10. The landing leg assembly of claim 8, wherein the seal member includes a body portion, first lip extending from the body portion toward the shaft, and a second lip extending from the body portion toward the shaft, and wherein the first and second lips are spaced from one another.

11. The landing leg assembly of claim 8, wherein the seal member includes a substantially rigid mounting portion and a substantially flexible sealing portion.

12. The landing leg assembly of claim 11, wherein the mounting portion is press fit within the bore.

13. The landing leg assembly of claim 11, wherein the seal member further includes a spring member axially biasing the sealing portion toward the shaft.

14. The landing leg assembly of claim 1, wherein the bearing member includes an end face that abuts the first leg member, and wherein the end face includes a circumferentially extending relief that is spaced from the bore and that receives an end seal therein such that the end seal is positioned between the end face of the bearing member and the first leg member.

15. The landing leg assembly of claim 14, wherein the end seal includes an O-ring.

16. The landing leg assembly of claim 1, wherein the bearing member is welded to an exterior of the first leg member.

17. A landing leg assembly for a heavy duty commercial vehicle, comprising:
   a first leg member defining an interior space;
   a second leg member telescopingly engaging the first leg member and movable between a retracted position and an extended position with respect to the first leg member;
   a gear assembly operably coupled to the second leg member and configured to receive an input from a user to move the second leg member between the retracted and extended positions, the gear assembly including a shaft member and a gear member fixed for rotation with the shaft member;
   an integral, single-piece bearing member including a bore that rotatably receives the shaft member, wherein the bearing member comprises a powdered iron nickel alloy having a density of greater than or equal to about 6.75 g/cc and is directly welded to the first leg member, wherein the bore includes a bore wall and at least one longitudinal relief extending longitudinally along the bore wall, and wherein the bore includes a circumferentially extending relief; and
   a seal member located within the circumferentially extending relief of the bore of the bearing member, wherein the seal member is position between the bearing member and the shaft.

18. The landing leg assembly of claim 17, wherein the bearing member is welded to the first leg member via at least two stitch welds spaced from one another.

19. The landing leg assembly of claim 17, wherein the density of the bearing member is greater than or equal to about 6.9 g/cc.

20. The landing leg assembly of claim 17, wherein the at least one longitudinal relief includes a plurality of longitudinal reliefs spaced about the bore wall from one another.

21. The landing leg assembly of claim 17, wherein the seal member includes a body portion, first lip extending from the body portion toward the shaft, and a second lip extending from the body portion toward the shaft, and wherein the first and second lips are spaced from one another.

22. The landing leg assembly of claim 17, wherein the seal member includes a substantially rigid mounting portion and a substantially flexible sealing portion.

23. The landing leg assembly of claim 22, wherein the mounting portion is press fit within the bore.

24. The landing leg assembly of claim 22, wherein the seal member further includes a spring member axially biasing the sealing portion toward the shaft.

25. The landing leg assembly of claim 17, wherein the bearing member includes an end face that abuts the first leg member, and wherein the end face includes a circumferentially extending relief that is spaced from the bore and that receives an end seal therein such that the end seal is positioned between the end face of the bearing member and the first leg member.

26. The landing leg assembly of claim 25, wherein the end seal includes an O-ring.

27. The landing leg assembly of claim 17, wherein the bearing member is welded to an exterior of the first leg member.

28. A landing leg assembly for a heavy duty commercial vehicle, comprising:
   a first leg member defining an interior space;
   a second leg member coupled to the first leg member and movable between a first position and a second position with respect to the first leg member;
   a gear assembly at least partially located within the interior space of the first leg member and operably coupled to the second leg member and configured to receive an input from a user to move the first leg member between the first and second positions, the gear assembly including a shaft member and a gear member fixed for rotation with the shaft member; and
   an integral, single-piece bearing member including a bore that rotatably receives the shaft member, wherein the bearing member comprises a powdered metal and is directly welded to the first leg member.

29. The landing leg assembly of claim 28, wherein the second leg member telescopingly engages the first leg member, and wherein the first position of the second leg member corresponds to a retracted position and the second position of the second leg member corresponds to an extended position.

30. The landing gear assembly of claim 29, wherein the bearing member is welded to an exterior of the first leg member.

\* \* \* \* \*